(12) United States Patent
Rowland

(10) Patent No.: US 9,702,106 B1
(45) Date of Patent: Jul. 11, 2017

(54) EROSION CONTROL EQUIPMENT PADS AND ACCESSORIES

(71) Applicant: J.F.R. Enterprises, Inc., Johns Creek, GA (US)

(72) Inventor: Jay F. Rowland, Johns Creek, GA (US)

(73) Assignee: J.F.R. ENTERPRISES INC., Johns Creek, GA (US)

( * ) Notice: Subject to any disclaimer, the term of this patent is extended or adjusted under 35 U.S.C. 154(b) by 45 days.

(21) Appl. No.: 14/279,544

(22) Filed: May 16, 2014

Related U.S. Application Data

(63) Continuation of application No. 13/045,085, filed on Mar. 10, 2011, now Pat. No. 8,740,505.

(60) Provisional application No. 61/313,088, filed on Mar. 11, 2010.

(51) Int. Cl.
*F16M 5/00* (2006.01)
*E02D 3/00* (2006.01)

(52) U.S. Cl.
CPC .............. *E02D 3/00* (2013.01); *F16M 5/00* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,378,949 A | * | 4/1968 | Dorris | A01G 1/08 47/33 |
| 3,415,013 A | * | 12/1968 | Galbraith | A01G 1/08 47/33 |
| 3,660,613 A | * | 5/1972 | Mullin | H02G 15/076 174/38 |
| 3,833,944 A | * | 9/1974 | Goettl | E04H 4/0018 4/506 |
| 4,229,497 A | | 10/1980 | Piazza | |
| 5,333,830 A | | 8/1994 | Millen | |
| 5,536,111 A | * | 7/1996 | Doernemann | E02B 3/06 405/16 |
| 5,584,602 A | * | 12/1996 | Bevil | A01G 1/08 405/36 |
| 6,050,539 A | | 4/2000 | Millen | |
| 6,874,282 B1 | | 4/2005 | Sweeney | |
| 7,334,385 B2 | | 2/2008 | Christen | |

(Continued)

*Primary Examiner* — Kyle Armstrong
(74) *Attorney, Agent, or Firm* — Eric W. Cernyar

(57) ABSTRACT

A prefabricated outdoor support pad is configured for transport from factory to field and above-grade installation on level ground to support a condenser or transformer. A flexible geosynthetic material is joined to the rigid platform along a perimeter and corners of the rigid platform. Upon installation, the geosynthetic material is inserted into the ground, forming an erosion-resisting barrier. Erosion control kits are also provided for outdoor condenser or transformer support pads. One type of the kit comprises a flexible geotextile soil retention barrier sized for attachment to the support pad and insertion into the ground and mechanical attachment members. Another type of the kit comprises a hard-walled ground-insertable soil retention barrier configured to wrap around soil under at least a corner of the support pad when the support pad is placed on grade and mechanical attachment members configured to attach the soil retention barrier to the support pad.

23 Claims, 15 Drawing Sheets

(56) References Cited

U.S. PATENT DOCUMENTS

2002/0044842 A1* 4/2002 Ianniello .................. E01C 3/00
405/302.7

* cited by examiner

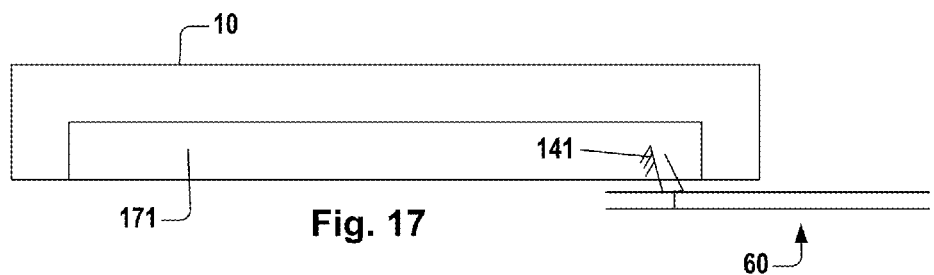
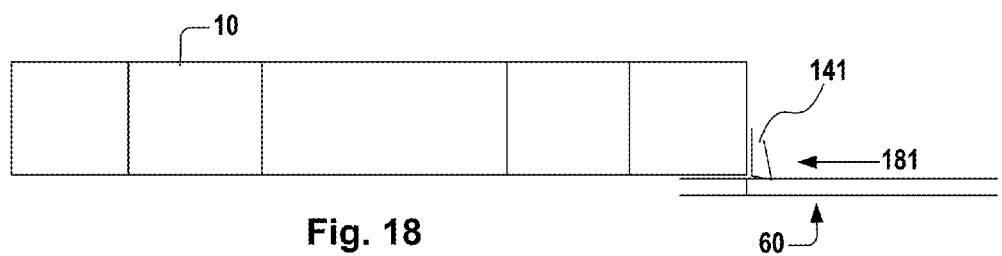
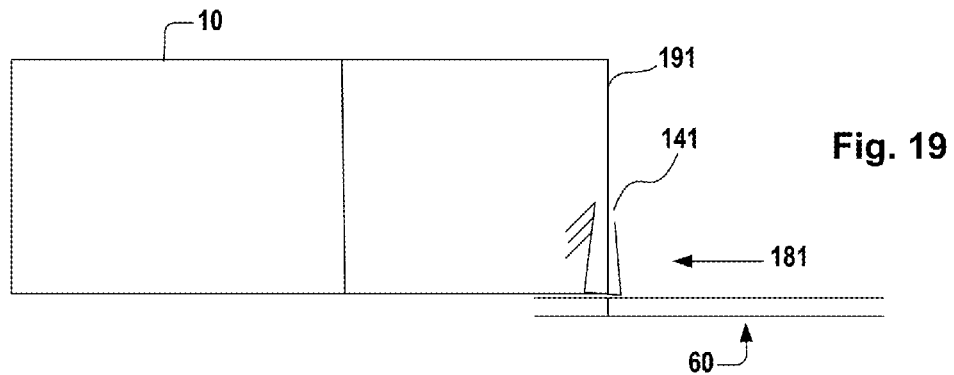
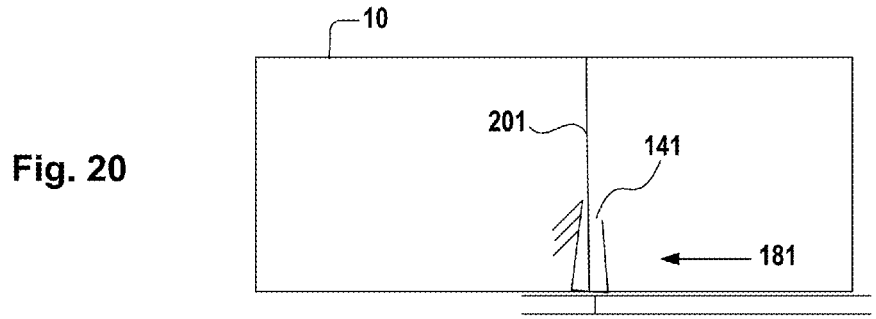

EROSION CONTROL EQUIPMENT PADS AND ACCESSORIES

RELATED DISCLOSURES

This application is a continuation of U.S. patent application Ser. No. 13/045,085, filed Mar. 10, 2011, entitled "Erosion Control Methods and Products for Equipment Pads, which in turn claims the benefit of U.S. Provisional Patent Application No. 61/313,088, filed on Mar. 11, 2010, entitled "Erosion Control Methods and Products," both applications of which are herein incorporated by reference.

FIELD OF THE INVENTION

This invention relates generally to equipment support pads, and more particularly, to products and methods for repairing, preventing, and controlling erosion of ground underneath and around equipment pads.

BACKGROUND OF THE INVENTION

Millions of homes and businesses are equipped with air conditioning and/or heating systems that include an outdoor unit or condenser 15. These outdoor units are typically installed on an equipment pad 10 resting on a non-foundation grade 11. In similar fashion, power companies install transformers on prefab equipment pads placed on grade. Very frequently, the soil beneath the pad begins to erode, as illustrated by the erosion 13 in FIG. 1. Average annual soil loss around an equipment pad in the U.S. may reach 0.9"/year, depending upon rainfall and soil conditions. Even if a pad is installed according to current industry norms, odds are high that the ground underneath its downslope edges will erode over time.

Eventually, the pad can become destabilized and begin to tilt. In any event, the result is unsightly. Repair frequently involves simply backfilling soil or rocks where the erosion has occurred, but this solution is temporary, as the backfilled soil soon erodes away.

Although installers and homeowners understand that "nature happens," they are uneasy and displeased with the look of a dangling unit, which is an expensive system component. The result also reflects poorly on the contractor. But contractors and homeowners are daunted by the effort and cost—for example, excavating and placing a foundation or footer—that they believe would be required to prevent the problem. Little thought has been given to inexpensive, low-labor systems or methods to prevent the erosion from occurring in the first place.

SUMMARY OF THE INVENTION

In one embodiment, a prefabricated outdoor support pad is configured for transport from factory to field and above-grade installation on level ground to support a condenser or transformer. The outdoor support pad comprises a rigid platform with a top surface for supporting a condenser or transformer and a flexible geosynthetic material joined to the rigid platform along a perimeter and corners of the rigid platform. The flexibility of the geosynthetic material facilitating its manipulation into an erosion-resisting configuration in the ground after the rigid platform is installed on grade.

In one version, the flexible geosynthetic material extends about 6 to 14 inches from a perimeter of the outdoor appliance support pad, although versions with other distances are also contemplated. The flexible geosynthetic material is preferably configured to form a soft soil retention barrier when inserted into the ground along the perimeter and corners of the pad, in order to resist soil from washing out from under the corners of the outdoor support pad.

The flexible geosynthetic material may be bonded to the rigid platform. The material may also be joined in a manner that prevents drainage from streaming between the flexible geosynthetic portion and the rigid platform at the place of attachment. In one version, the geosynthetic material also covers the underside of the pad and extends beyond edges of the pad, forming a portion configured for insertion into the ground.

In another embodiment, erosion control kits are provided for outdoor condenser or transformer support pads. One type of erosion control kit comprises a flexible geotextile soil retention barrier sized for attachment to the support pad along at least portions of two sides of the support pad, at or below a top edge of the pad, and further sized, upon attachment, to extend beyond a bottom edge of the pad so that it can be inserted about 6" to 14" into the ground and wrap around soil under a corner of the support pad. The kit also includes mechanical attachment members (such as clips) configured to attach the soil retention barrier to the support pad. Furthermore, a first section of the flexible geotextile soil retention barrier is configured for attachment to the support pad and a second section of the flexible geotextile soil retention barrier is configured for insertion into the ground, using downward force on an unattached edge of the flexible geotextile, around the outdoor support pad after the outdoor support pad is placed on grade.

The soil retention barrier may include reinforced attachment areas to facilitate mechanical fastening of the soil retention barrier to the support pad. Also, the kit may include one or more leveling support members for leveling the support pad, wherein the leveling support members are placed under the support pad and above sloped, eroded soil.

Another type of erosion control kit comprises a hard-walled ground-insertable soil retention barrier configured to wrap around soil under at least a corner of the support pad when the support pad is placed on grade and mechanical attachment members configured to attach the soil retention barrier to the support pad. The hard-walled ground-insertable soil retention barrier includes one or more sections configured to form a soil-impermeable corner under the support pad corner. The kit configured to be installed—and the hard-walled ground-insertable soil retention barrier to be driven and inserted into the ground—after the support pad is placed on grade.

In one version of the erosion control kit, the hard-walled ground-insertable soil retention barrier comprises a plurality of rigid sections that overlap. Furthermore, the hard-walled ground-insertable soil retention barrier may include both planar and corner pieces. The rigid sections may have fastening holes to facilitate attachment to the support pad.

The kit may also include additional implements. For example, the kit may include at least one gasket configured to seal at least a portion of the hard-walled ground-insertable soil retention barrier against the support pad. The kit may also or alternatively include an insertion tool that facilitates insertion of the soil retention barrier into the soil alongside the support pad when it is resting on grade. The kit may also or alternatively include one or more leveling support members for leveling the support pad, wherein the leveling support members are placed under the support pad and above sloped, eroded soil.

BRIEF DESCRIPTION OF THE DRAWINGS

The drawings are not to scale, and like numbers are used throughout.

FIG. 17 is a cross sectional view of a multi-layered fabric assembly coupled to the foam core of an equipment pad through a toothed clip.

FIG. 18 is a cross sectional view of a multi-layered fabric assembly coupled to the side of an equipment pad via a mechanical fastener.

FIG. 19 is a cross sectional view of a multi-layered fabric assembly joined to a toothed clip clamped on an outside edge of the pad and anchored with a screw.

FIG. 20 is a cross sectional view of a multi-layered fabric assembly joined to a toothed clip clamped to an internal rib of the pad and anchored with a screw.

DETAILED DESCRIPTION OF THE INVENTION

In describing preferred and alternate embodiments of the technology described herein, as illustrated in FIGS. 1-35, specific terminology is employed for the sake of clarity. The technology described herein, however, is not intended to be limited to the specific terminology so selected, and it is to be understood that each specific element includes all technical equivalents that operate in a similar manner to accomplish similar functions.

Several embodiments of erosion control apparatuses are provided in this disclosure. All involve a soil retention apparatus driven or tucked into the ground, a percolating fabric overlaying the adjoining graded soil, or a combination of the two. In some embodiments, accessories are provided for attaching the erosion control apparatus to the equipment pad 10 and/or anchoring a portion of the erosion control apparatus into the ground. The embodiments preferably use durable, geosynthetic materials such as plastic and other geocomposites. In particular, the soil retention apparatus that resides in the ground preferably will last for the life of the equipment pad.

Figure 1:
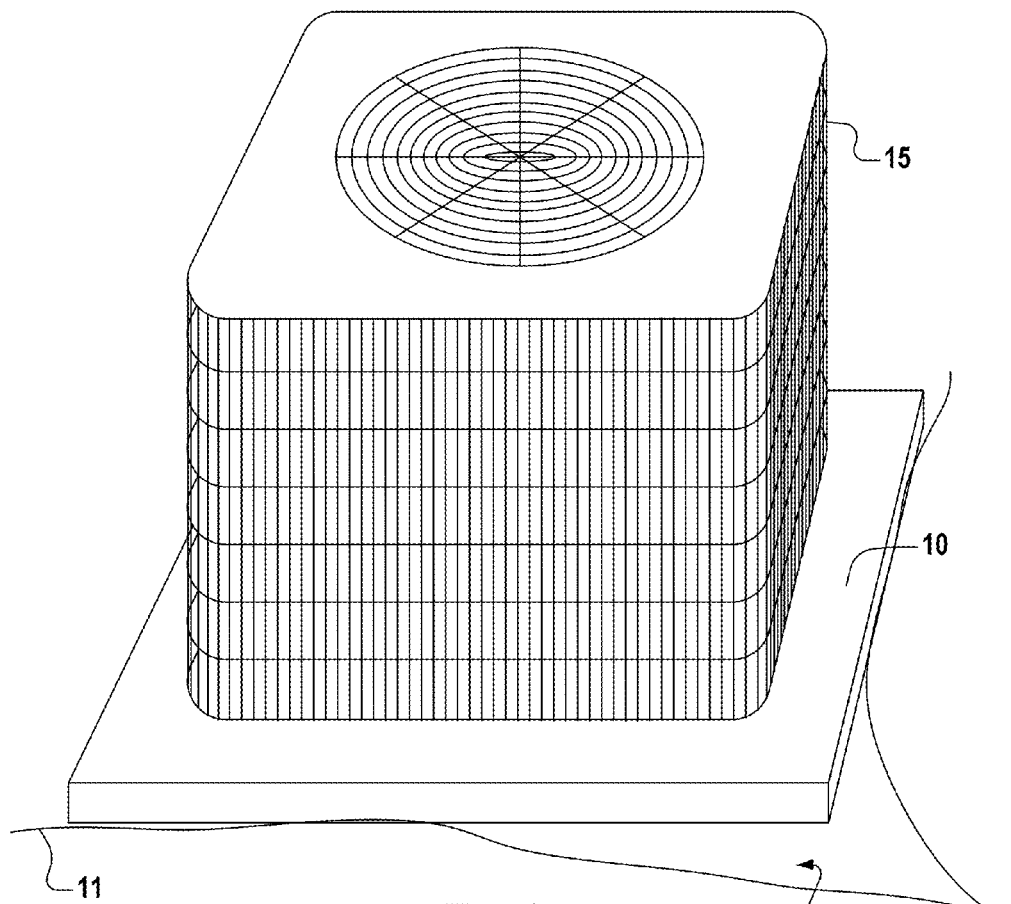
FIG. 1 is a perspective view of an air conditioning unit or condenser on an outdoor equipment pad.
Figure 2:
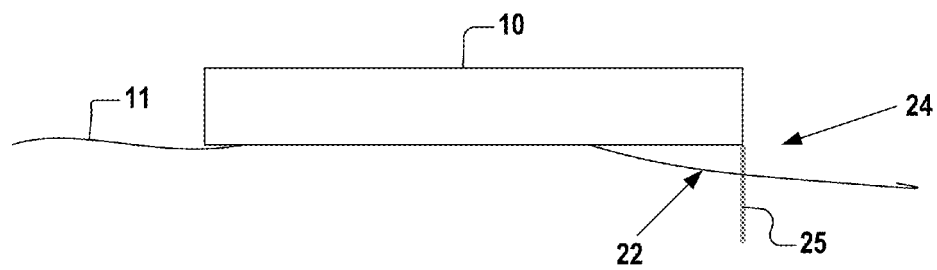
FIG. 2 is a side view of an equipment pad on eroded grade, being prepared for remediation.

FIG. 2 is a side view of an equipment pad 10 on an eroded grade 11, being prepared for remediation in accordance with one embodiment. A primary backfill 22 of soil and/or other materials is made between the eroded grade and the overhanging portion of the pad 10. A slender, low-porosity soil retention barrier 25 is inserted or tucked into the ground near the perimeter of the pad 10 along at least the downhill edge(s) of the pad. A secondary backfill 24 is then made against the soil retention barrier 25. This remediation is accomplished without excavation of soil.

In one embodiment, the soil retention barrier 25 is a soft-walled barrier. In a more detailed embodiment, shown more particularly in FIG. 3, the soil retention barrier 25 is a permanently-installed silt fence 35 made of a woven or non-woven geotextile fabric. The silt fence 35 includes a plurality of pore spaces or openings between the fabric fibers that are too small for soil to pass through but that are large enough to allow water to penetrate. The silt fence 35 serves to retain dirt. In one embodiment, the bottom edge of the silt fabric 35 is configured with barbs 37 that are readily grasped by an insertion tool and which serve to further anchor the silt fabric 35 in the ground.

In another embodiment, the soil retention barrier 25 comprises a rigid, "hard-walled" barrier, as described more fully below in connection with FIGS. 21-27.

Figure 4:
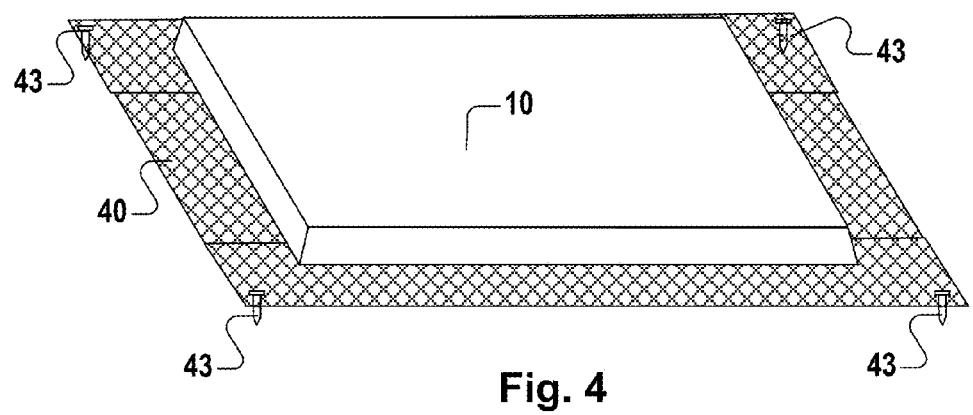
FIG. 4 is a perspective view of an equipment pad surrounded by a skirt of percolating fabric resting over the surrounding soil.

FIG. 4 is a perspective view of an equipment pad 10 completely surrounded by a skirt of four rectangular sections of percolating fabric 40 resting over the soil or ground surrounding the pad 10. The percolating fabric 40 is a porous, three-dimensional matrix of water-trapping voids meant to mimic river stone and allow water to percolate down and away from the pad 10 and fill dirt. The percolating fabric 40 may be embedded with grass seeds (not shown) or include corner attachment pins 43 to anchor the fabric to the ground.

Figure 5B:
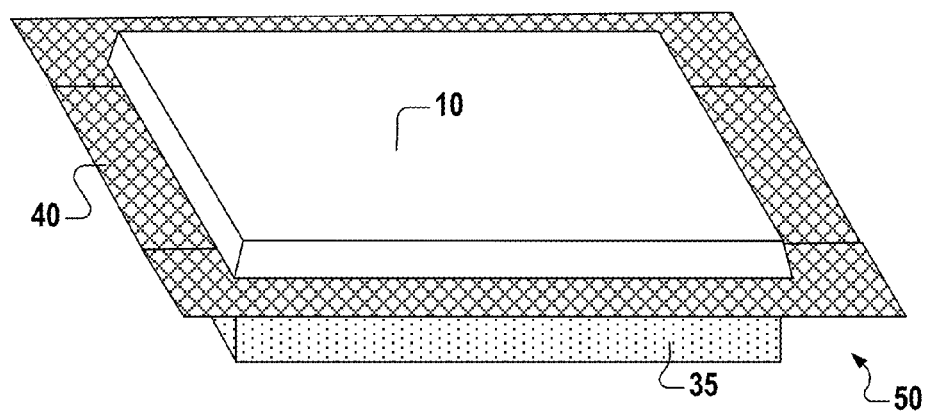
FIG. 5B is a perspective view of an equipment pad surrounded by a two-layer assembly of percolating and silt fabric.
Figure 5A:
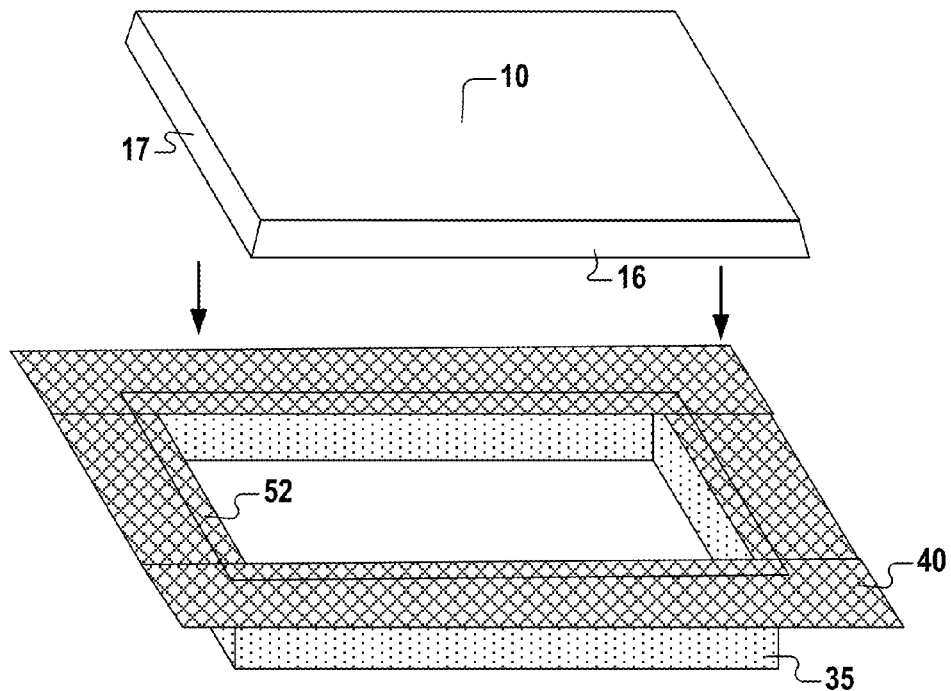
FIG. 5A is an exploded view diagram of a multi-layered fabric skirt installed into and over ground prepared for supporting an equipment pad.

FIGS. 5A and 5B depict an equipment pad 10 surrounded by a two-layer assembly 50 of a silt fence 35 tucked into the ground and a percolating fabric 40 overlaying the ground. The silt fence 35 acts as a barrier to retain soil behind the fence and thereby resists erosion under the pad. The percolating fabric 40, which has larger pores than and is not as dense as the silt fence 35, causes water to seep and spread slowly or gradually in an unsteady pattern. Thus, the water moves outward and away from the pad, minimizing erosion underneath and around the fabric 40.

In operation, the assembly 50 is laid out about the perimeter of an existing or to-be-placed equipment pad 10. The top layer of percolating fabric 40 is folded up, providing access to the bottom silt fence 35. The bottom silt fence 35 is tucked into the ground. The bottom silt fence 35 provides a continuous wrap around the soil under the corner of the equipment pad 10, such that soil does not wash from the corner. If necessary, dirt is backfilled against the silt fence 35. Then, the top layer of percolating fabric 40 is folded back down, over the fill dirt.

A standard installation designed to surround a 36"×36" pad 10 will call for about 20 lineal feet (i.e., 4 sides times 5 feet for each side) of the assembly 50. Typical equipment pads have dimensions in the range of 16"×36" to 60"×67", with base heights ranging from 2" to 4". The silt fence 35 should be tucked into the ground 6" to 1' deep and have an attachment strip 52 under the pad of about 1-2", for a total fabric width of 8" to 1' 2". The top layer of percolating fabric 40 should extend 6" to 1' beyond the pad and have an attachment strip 52 under the pad of about 1-2", for a total fabric width of 8" to 1' 2".

In one embodiment, the weight of the equipment pad 10 alone anchors the assembly 50 to the ground along a pad attachment strip 52 of the assembly 50. In another embodiment, mechanical fasteners (e.g., screws) are used to attach the pad attachment strip 52 to the underside of the pad 10. In yet another embodiment, the pad attachment strip 52 is folded up and attached, with fasteners, to the sides 16, 17 of the equipment pad 10. In yet another embodiment, the assembly 50 includes a long rectilinear plastic or metal section 151 (FIG. 15) along the pad attachment strip 52 to facilitate mechanical fastening of the assembly 50 to the pad 10.

Figure 3:
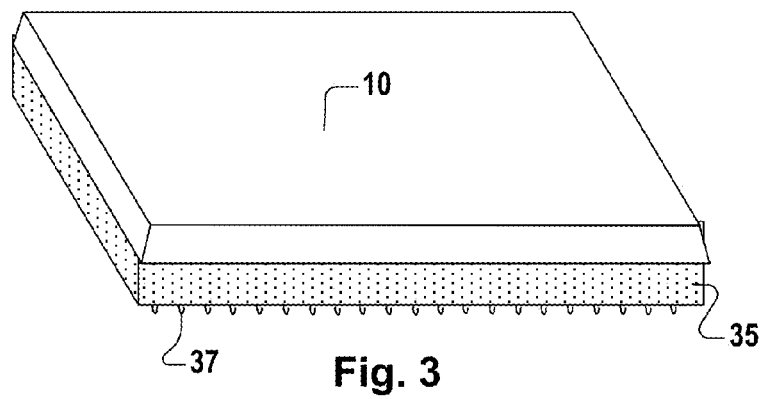
FIG. 3 is a perspective view of an equipment pad surrounded by a substantially vertical skirt of silt fabric tucked or inserted downwardly into the surrounding soil.

In each of the embodiments depicted in FIGS. 3, 4 and 5B, the erosion control apparatus may come pre-attached to the equipment pad 10. For plastic pads, the erosion control apparatus may be molded, welded, glued, chemically bonded, and/or mechanically attached to the pad during production. For concrete pads, the erosion control apparatus may be tucked into foam or cemented in place.

For pads with a pre-attached dual-layer fabric assembly 50 as shown in FIG. 5B, the portions of fabric assembly 50 extending beyond the pad edges are not attached to each other, so that the bottom layer or silt fence 35 may be tucked into the ground without tucking or wadding the top layer of percolating fabric 40. In one embodiment, the top layer of percolating fabric 40 is formed across the entire underside of the pad 10 to provide additional ground support. Assuming there are no gaps between the pad edge and fabric 40, a drainage path is not likely to form under the pad 10.

Figure 6:
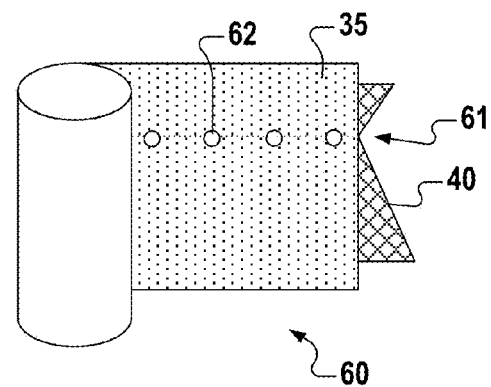
FIG. 6 is a perspective view of a roll of a multi-layered fabric assembly specially configured for use in minimizing soil erosion under and proximate an equipment pad.

FIG. 6 is a perspective view of a roll of a multi-layered fabric assembly 60 specially configured for use in minimizing soil erosion under and proximate an equipment pad 10. In an exemplary embodiment, the fabric assembly 60 comprises a fabric silt fence 35 attached at regularly spaced and linearly arranged stitch, weld, or pin attachment points 62 along an adjoinment strip 61 to a porous, percolating fabric 40. The adjoinment strip 61 is spaced approximately 1 to 2 inches from the inside edges of the silt fence 35 and percolating fabric 40. In the exemplary embodiment, the adjoinment strip 61 is not continuously melted or stitched together. Rather, regularly spaced and linearly arranged spot welds, stitches, or pins are provided to attach the layers together so that the contractor can easily detach the layers at the pad corners.

This fabric assembly 60 may be easily carried to a jobsite and cut to fit any size or brand of equipment pad 10. In operation, the fabric assembly 60 is unrolled, cut to length, and placed around and under the perimeter of the pad 10. To install, the top layer of percolating fabric 40 is folded up, the lower fabric layer or silt fence 35 is tucked into the ground, and the top layer of percolating fabric 40 is then placed back on the ground and pinned at the corners.

Figure 7:
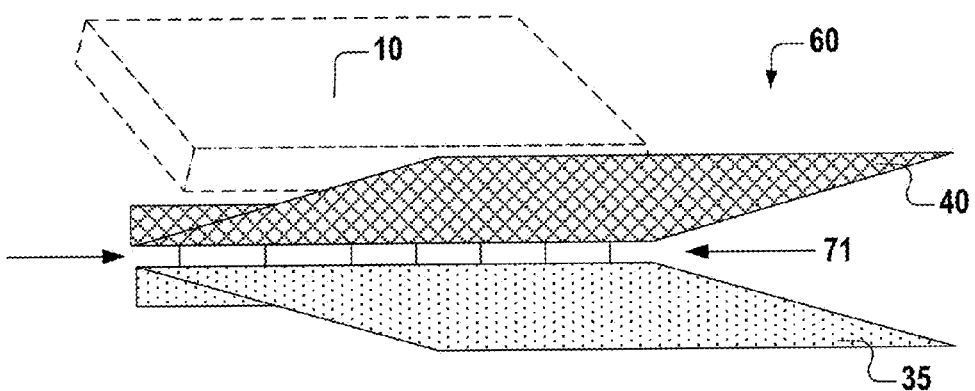
FIG. 7 is a perspective view of a multi-layered fabric assembly suitable for erosion control laid out next to a side of an equipment pad.
Figure 8:
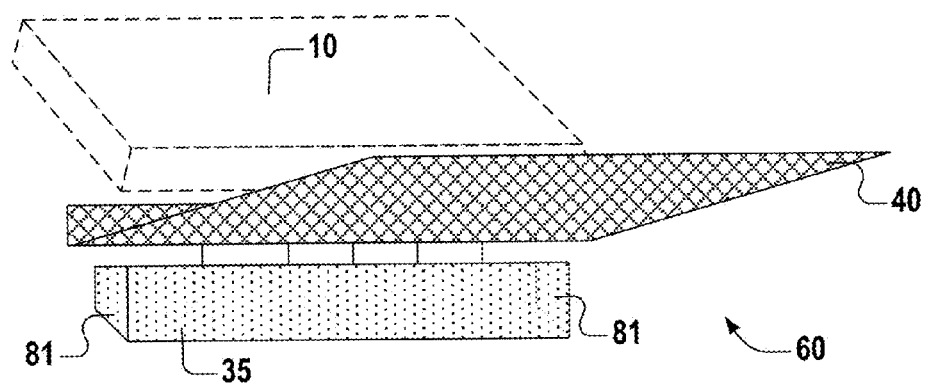
FIG. 8 is a perspective view of the multi-layered fabric assembly of FIG. 7 after attachment points proximate the pad corners have been severed.
Figure 9:
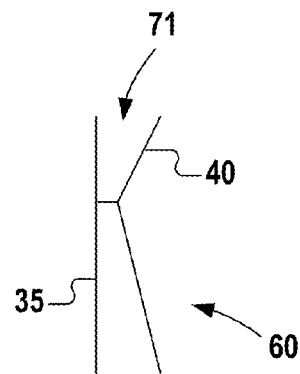
FIG. 9 is a cross-sectional view of one embodiment of a loosely-connected multi-layered fabric assembly.

In a further embodiment, the two fabrics 35 and 40 are joined loosely as shown in FIGS. 7-9. Stitches with slack, or welded areas that have been pulled and elongated while still melted, provide a space 71 of $\frac{1}{32}$" to $\frac{1}{8}$". An installer can quickly and easily run a blade through that space 71 to sever attachment points near the pad corners. This frees the distal ends 81 of the bottom fabric 35 to be tucked into the ground without inserting or wadding the top layer.

Figure 10:
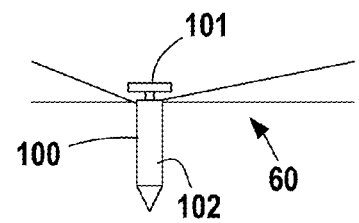
FIG. 10 is a side view of a multi-layered fabric assembly with a pin inserted through an attachment point.
Figure 11:
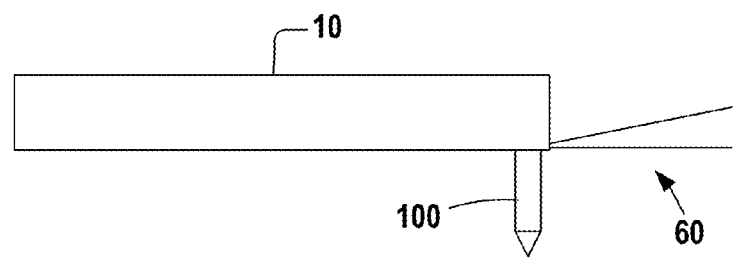
FIG. 11 is a side view of a multi-layered fabric assembly joined by a landscape pin under an equipment pad.

In the embodiment of FIG. 10, pins 100 (preferably 3-4" long, and made of plastic or metal) are pre-placed on the fabric assembly 60, forming part of the spot attachment of the two fabrics 35 and 40. In one particular embodiment, as the plastic fabric is heated/welded/tacked at certain points, a pin 100 is attached at the same time. In another embodiment, the pins 100 form the only source of attachment of the two fabrics 35 and 40.

During installation, an installer turns the pin 100 down into the ground to anchor the fabric assembly 60. To detach the fabric assembly 60 at the pad corners, the installer removes the necessary pins 100, using them to anchor the outside corners of the upper layer of percolating fabric 40 at the end of the installation.

Figure 12:
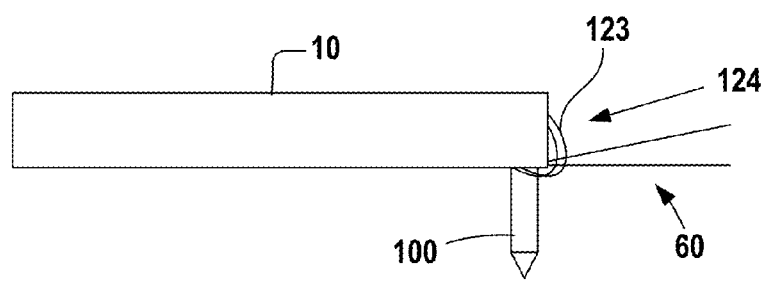
FIG. 12 is a side view of a multi-layered fabric assembly joined by a landscape pin mounted to an attachment strip configured for attachment to the equipment pad.
Figure 13:
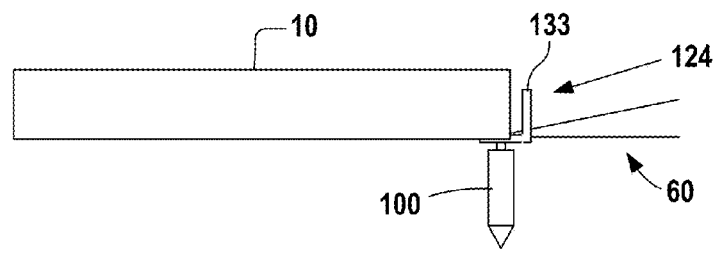
FIG. 13 is a side view of a multi-layered fabric assembly joined by a landscape pin mounted to a bracket configured for attachment to the equipment pad.
Figure 14:
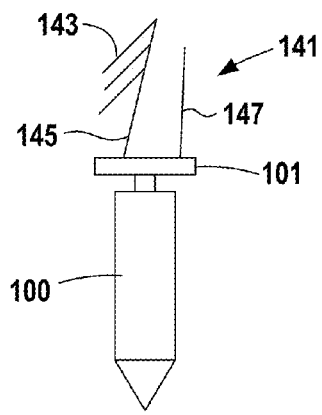
FIG. 14 is a side view of a toothed clip mounted on a landscape pin, the toothed clip being configured to mount the landscape pin to an equipment pad.
Figure 16:
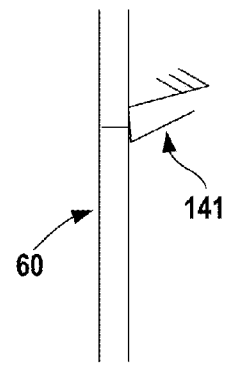
FIG. 16 is a cross sectional view of a multi-layered fabric assembly joined to a toothed clip.

Several embodiments are contemplated for attaching the fabric assembly 60 to the pad 10. In one embodiment, depicted in FIGS. 10-12, the pin 100 comprises a pin head 101 narrowly attached to a pin body 102 in a manner that forms a gap between the pin head 101 and the pin body 102. In FIG. 12, the pin 100 includes an attachment strap 123 configured to be folded up against the side of the pad 10 and mechanically fastened thereto with a screw or other fastener 124. In yet another embodiment, depicted in FIG. 13, the pin 100 includes a bracket 133 configured to abut the side of the pad 10 and be mechanically fastened thereto with a screw or other fastener 124.

FIGS. 14-20 illustrate several embodiments utilizing a plastic or metal clip 141 to attach a multi-layered fabric assembly 60 to an equipment pad 10. The plastic or metal clip 141 includes two biased tabs 145 and 147 for clamping an equipment pad edge or rib. In the embodiment shown in FIGS. 14, 16-17, and 19-20, the clip 141 also includes outwardly facing foam-gripping teeth 143 along tab 145. In another embodiment, not shown, the tabs 145 and 147 include sharp, inwardly facing teeth configured to be closed by pliers to bite into a plastic edge or rib of the equipment pad. In yet another embodiment, depicted in FIG. 18, the teeth are entirely omitted from the tabs 145 and 147. In another embodiment, not shown, the clip 141 includes a toothed tab 145 without a cooperating clamping tab 147.

Figure 15:
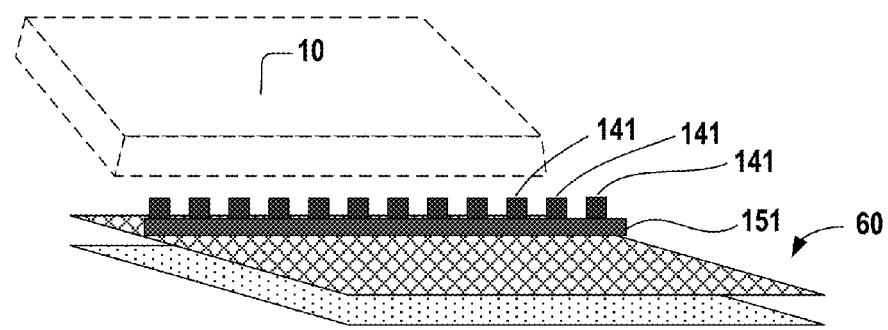
FIG. 15 is a perspective view of a multi-layered fabric assembly joined to an attachment strip joined to a plurality of toothed clips for mounting the multi-layered fabric assembly to an equipment pad.

In the embodiments depicted in FIGS. 16-20, the clip 141 is mounted to a multi-layered fabric assembly 60. In one embodiment, depicted in FIG. 14, the clip 141 is also mounted on the head 101 of a landscape pin 100. In FIG. 15, a row of clips 141 is joined to a solid (e.g., plastic or metal) attachment strip 151 for mounting a large section of multi-layered fabric assembly 60 to a side of the equipment pad 10.

The clip 141 is configured to mount the fabric assembly 60 to an equipment pad in one or more of many different ways. In FIG. 17, the clip 141 is inserted into the foam core 171 of an equipment pad 10. In FIG. 18, the clip is coupled to the side of an equipment pad 10 via a screw or other mechanical fastener 181. In FIG. 19, the clip 141 is clamped around an outside edge 191 of the equipment pad 10. In FIG. 20, the clip 141 is clamped around an internal rib 201 of the equipment pad 10. In both FIGS. 19 and 20, the clip is optionally further coupled to the equipment pad 10 with an anchoring screw or other mechanical fastener 181.

FIGS. 21-27 illustrate various embodiments and interlocking pieces of a hard-walled soil retention barrier. The pieces are tapered for easy insertion into the ground and interlock to form a continuous wall and rigid barrier. Although not shown in the drawings, the wall may include decorative features (e.g., faux stone) along the top.

Figure 21:
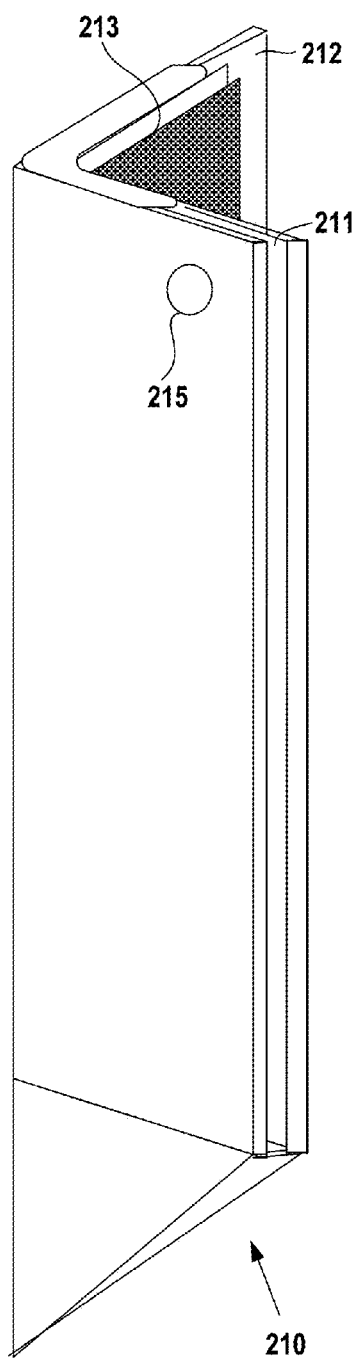
FIG. 21 is a perspective view of one embodiment of a corner stake used to form part of a hard-walled soil erosion barrier.
Figure 22:
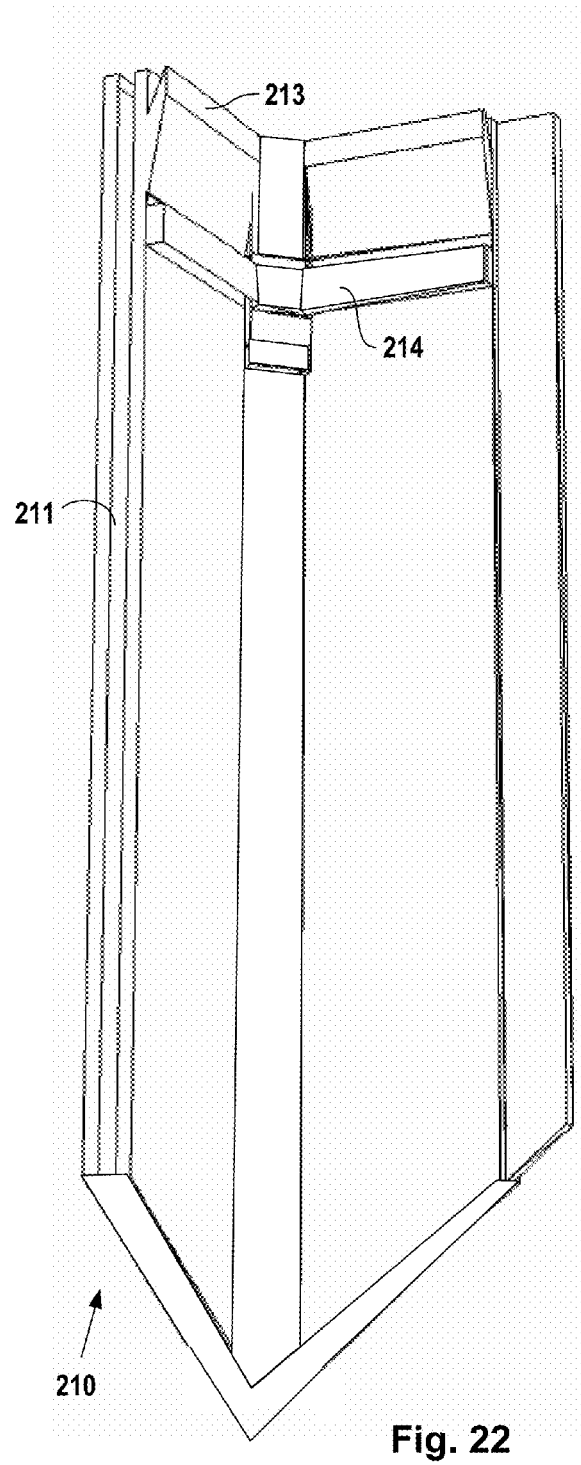
FIG. 22 is an inside perspective view of the corner stake of FIG. 21

FIGS. 21 and 22 illustrate a corner stake or anchor 210 with dimensions of approximately 4"×4"×12". The corner stake 210 is substantially continuous at the corner, such that soil will not wash out from under the corner of the equipment pad 10. This design is an improvement over corners that are open or highly porous. One side of the corner stake 210 includes a channel 211 for receiving a cooperating tab or projection of an interlocking side wall piece 231. The other side of the corner stake 210 includes a tab or projection 212 for inserting into a cooperating channel of a side wall piece 231. The channel 211 and tab 212 may extend along all of or less than the full length of corner stake 210.

An alignment shelf 214 is provided along the backside of the corner stake 210 to rest under the pad edge. A gasket or sealing boss 213, which may be shaped like a wiper blade, is provided along the top of the backside of the corner stake 210. The sealing boss 213 seals the corner stake 210 against the side of the equipment pad 10, blocking the flow of water therebetween. Also, the sealing boss 213 accommodates a variety of corner radii and side slopes. A fastening hole 215 is provided for inserting a machine screw, concrete screw, nail, or other mechanical fastener. The hole 215 may be located such that two adjacent wall portions 231 are attached to the pad 10 with one fastener.

Figure 23:
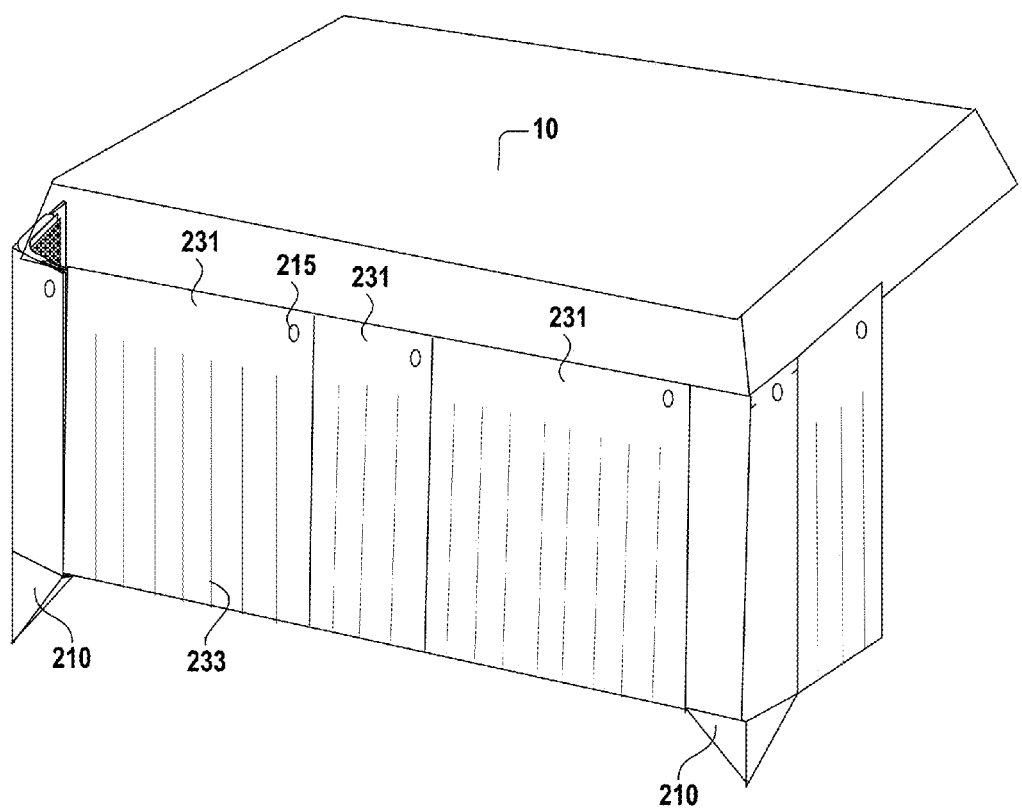
FIG. 23 is a perspective view of a hard-walled soil retention apparatus comprising a plurality of corner stakes and side wall pieces attached to an equipment pad.

As shown in FIG. 23, a plurality of sidewall pieces 231 of varying widths (e.g., 1", 2", 4", 8", 16") is also provided. Although not shown in the drawings, the sidewall pieces 231, like the corner stakes 210, include a channel along one vertical side and a projecting tab along the other vertical side. In this manner, the corner pieces and sidewall pieces can be assembled to interlock with each other, and be driven into the ground. Also like the corner stakes 210, the sidewall pieces 231 include an alignment shelf or protrusion (not shown) to facilitate alignment of the interlocking pieces. The sidewall pieces 231 may also include gaskets or sealing bosses and fastening holes 215.

In one embodiment, the sidewall pieces are also ribbed and scored at 1" increments so a contractor can cut to length and still interlock the cut piece with the piece next to it. The sidewall pieces 231 may also be shaped, thinned, or perforated between the ribs 233 or along the scored sections to aid driving them into the ground.

Figure 24:
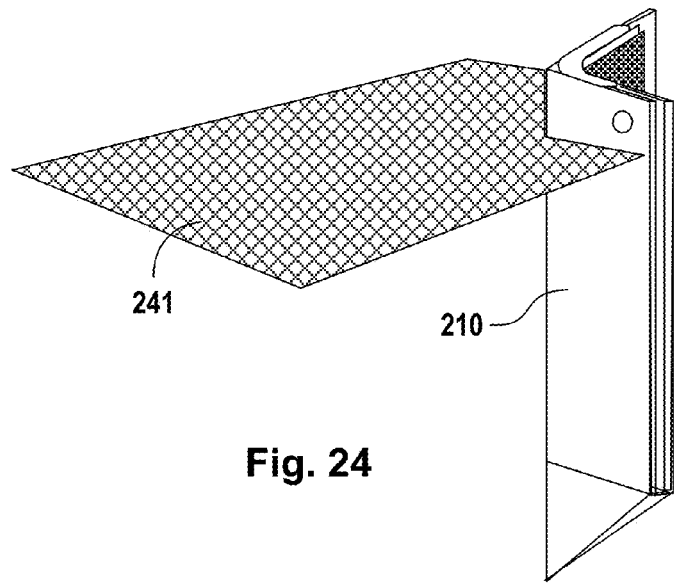
FIG. 24 is a perspective view of one embodiment of a corner stake and percolating fabric assembly.
Figure 25:
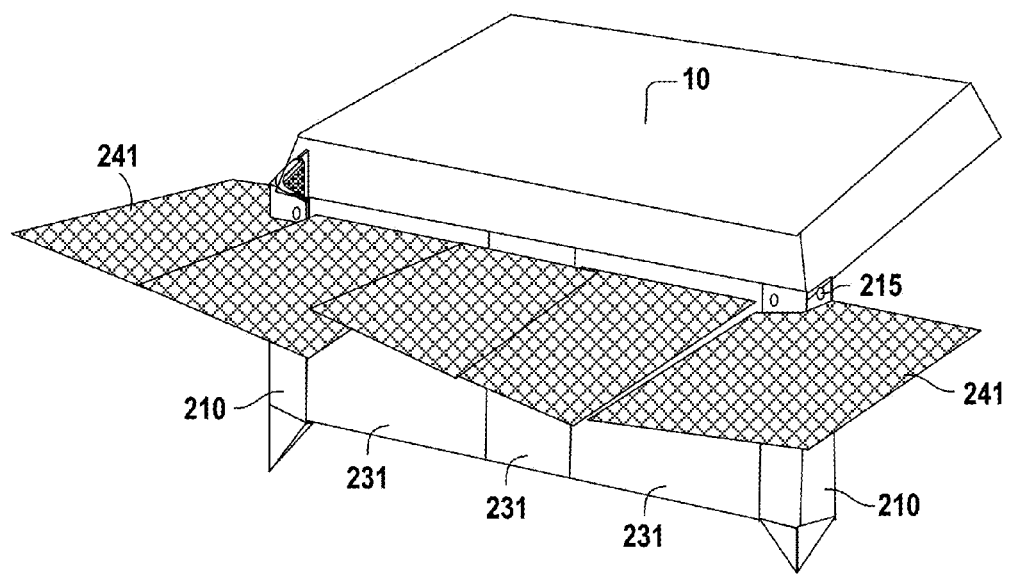
FIG. 25 is a perspective view of one embodiment of an erosion control apparatus comprising a combination of a hard-walled soil retention apparatus and a flexible percolating fabric.

FIGS. 24 and 25 depict an embodiment in which percolating fabric sections 241 are pre-attached to the corner stakes 210 and sidewall pieces 231. FIG. 25 depicts several of these corner and sidewall pieces assembled together and installed on an equipment pad 10. The fabric sections 241 may be pre-attached above or below the fastening holes 215.

Figure 26:
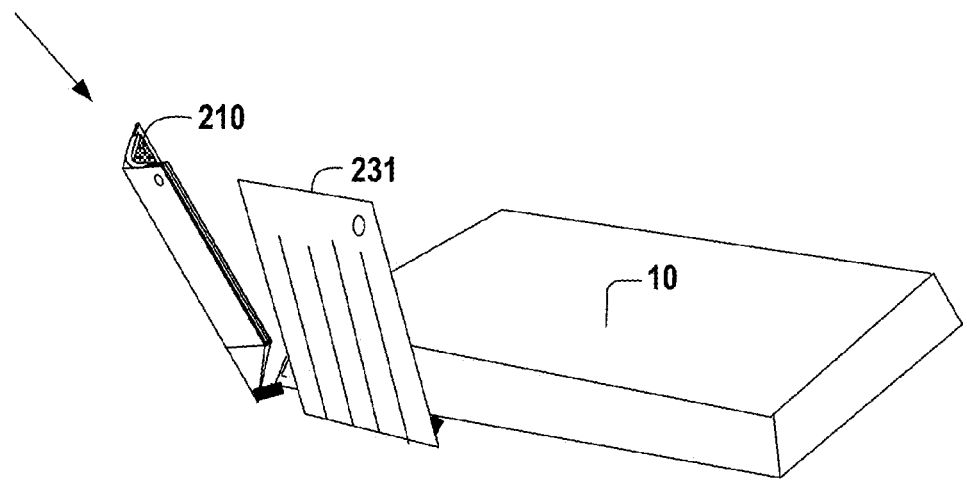
FIGS. 26 and 27 are perspective views of one embodiment of an equipment pad with pre-attached corner and side wall pieces.
Figure 27:
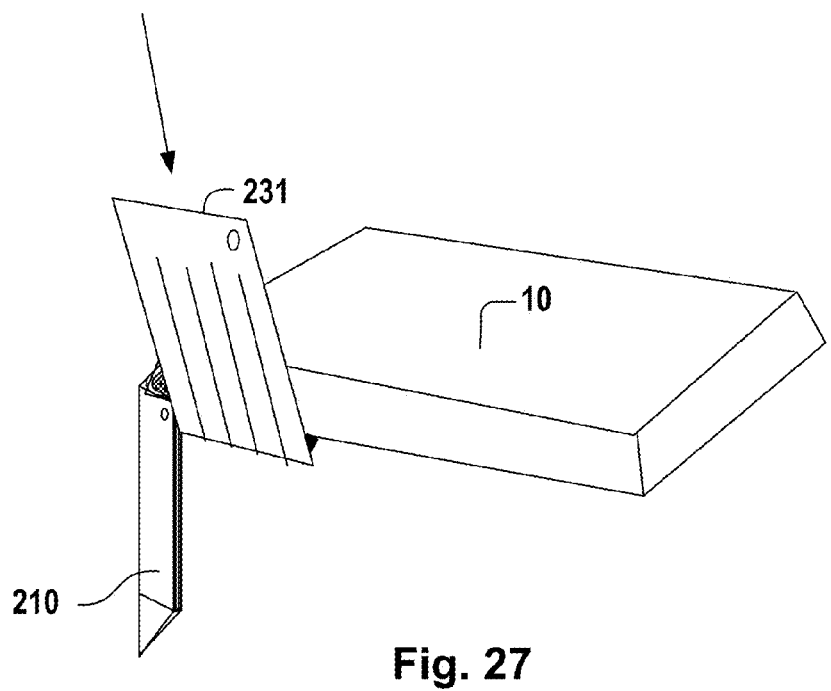

Hard walls may also come pre-attached to a pad 10 at the factory. FIGS. 26 and 27 are perspective views of one embodiment of an equipment pad 10 with pre-attached corner and side wall pieces. When the pad 10 is at a jobsite, a contractor may simply set the pad 10 on the ground, aim the corner and side wall pieces 210 and 231 straight down, and hammer them. When hammered, the pieces break free from the pad 10 and go into the ground.

In one embodiment, not shown, equipment pads 10 are provided that have dovetail notches formed on the bottom edges. The dovetail notches facilitate attachment of the corner and side pieces of the hard-walled soil retention barrier. The corner and side pieces may have corresponding protrusions to allow dovetailing, snapping, or "locking" in place. In another embodiment, not shown, the equipment pads 10 have spikes or fingers, shaped like picture hangers, along the bottom edges. An erosion control apparatus is mounted over these spikes and held in place.

Figure 28:
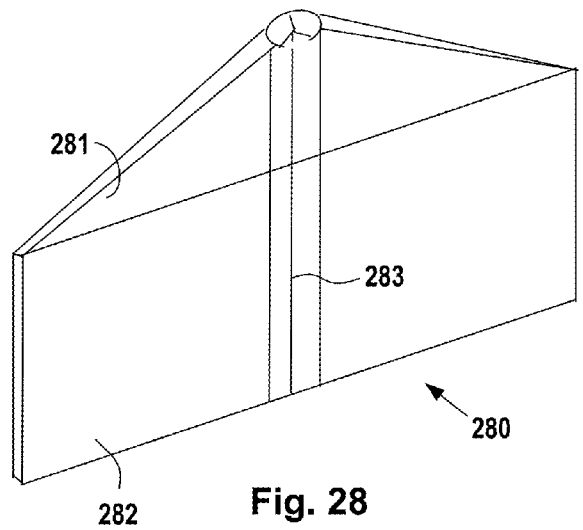
FIG. 28 illustrates one embodiment of an installation tool to facilitate insertion of a soil retention barrier into the ground.
Figure 29:
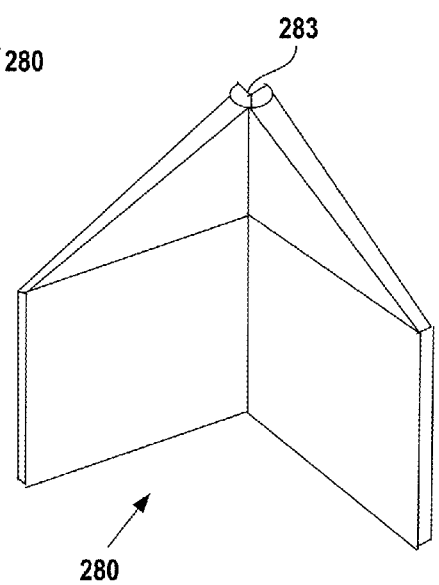
FIG. 29 illustrates the installation tool of FIG. 28 bent at a 90-degree angle along a hinge line.

FIG. 28 illustrates one embodiment of an installation tool 280 to facilitate insertion of both soft-walled and hard-walled soil retention barriers into the ground. The installation tool 280 comprises a force distribution upper member 281 joined to substantially planar, wedge-shaped lower member 282. The upper member 281 is preferably triangularly shaped or arc shaped to distribute the force of a hammer blow across the full width of the wedge-shaped lower member 282. As shown in FIG. 29, the installation tool 280 may be folded along a thinned vertical midsection 283 for inserting soil retention barriers proximate to the corners of an equipment pad. The installation tool 280 is constructed of metal, wood, or plastic, or some combination thereof.

To insert a rigid side wall piece, the side wall piece is hammered partway into the ground. Then the installation tool 280 is placed on top of the side wall piece against the side of an equipment pad. To insert a rigid corner piece, the installation tool 280 is folded approximately 90 degrees along its midsection 283 before being placed along the corner of an equipment pad. A hammer, mallet, or other tool is then used to pound the rigid piece into the ground, such that the hammer does not strike the pad 10 as the rigid piece is driven below the top surface of the pad and close to grade. The rigid side wall or corner piece may be driven into the ground with the installation tool 280, or after the installation tool 280 has been pounded into the ground. To insert a soft-walled, fabric-based erosion control barrier, the wedge-shaped lower member 282 is pinned against the fabric and used to drive it into the ground. Thus, the walls may be installed without traditional trenching, even around corners.

Figure 30:
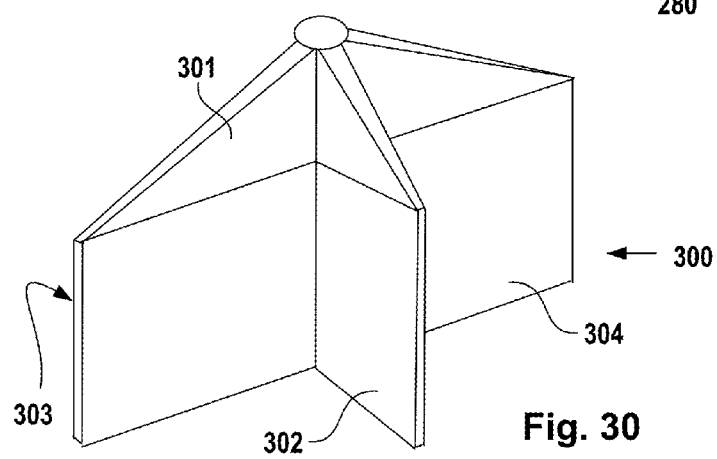
FIG. 30 illustrates another embodiment of an installation tool to facilitate insertion of a soil retention barrier into the ground.

FIG. 30 illustrates another embodiment of an installation tool 300. This installation tool 300 comprises first and second substantially planar, wedge-shaped bottom members 302 and 304, with second bottom member 304 projecting out perpendicularly from one side (but not the other) of the first bottom member 302. The installation tool 300 also includes a force distribution top member 301 that distributes the force of a hammer blow across the full extents of the first and second bottom members 302 and 304.

To insert a side wall piece, the side wall piece is hammered partway with a hammer or mallet. Then the installation tool 300 is placed on top of the side wall piece with the flat side 303 of the installation tool 300 facing toward the side of an equipment pad, and then the side wall piece is pounded into the ground via the installation tool 300. To insert a corner piece, the first and second bottom members 302 and 304 are laid on top of the corner piece, with the corner facing the corner of an equipment pad, and then the corner piece is pounded into the ground.

It is contemplated that the installation tool 280 or 300 may be packaged as part of a kit that includes components of any of the erosion control apparatuses described herein.

Figure 31:
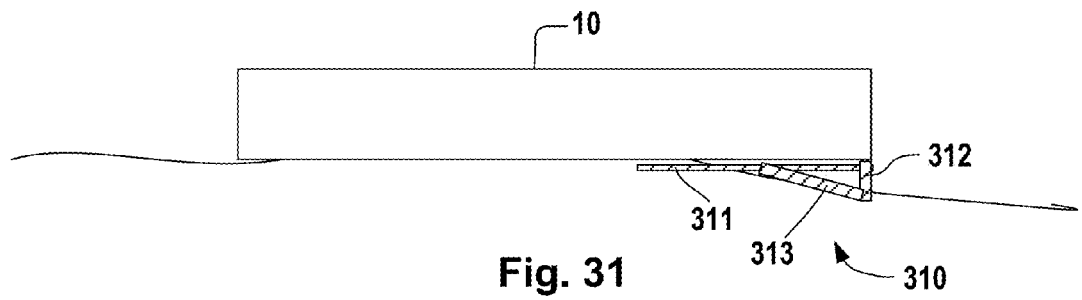
FIG. 31 illustrates an embodiment of an equipment pad support member.
Figure 32:
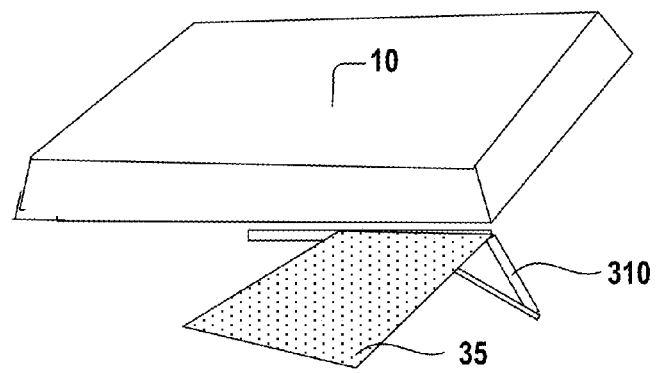
FIGS. 32-33 illustrate embodiments of an equipment pad support member attached to an erosion control apparatus.
Figure 33:
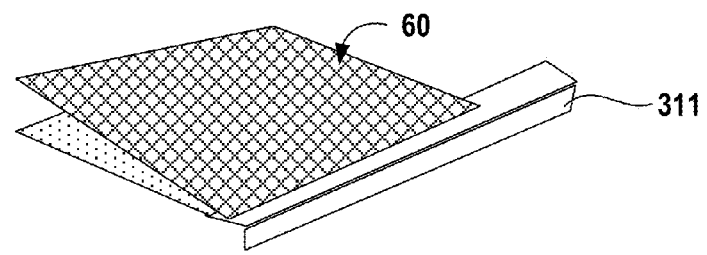

FIGS. 31-33 illustrate various embodiments of an equipment pad support member in the form of a wedge-able bracket 310, used to repair erosion underneath an equipment pad 10 and level the pad 10. The bracket 310 comprises three pivotally attached segments or bars 311, 312, and 313. The horizontal segment 311 and angle segment 313 may be hammered underneath the pad edge, wedging the vertical or prop segment 312 underneath the pad 10 to push the pad 10 up. It is contemplated that several such brackets 310 be used at spaced-apart intervals to support the pad 10, in order to prevent the pad 10 from cracking or bowing.

In FIGS. 32-33, the bracket 310 is pre-attached to an erosion control apparatus. In FIG. 32, the erosion control apparatus comprises a soil retention fabric section 35. In FIG. 33, the erosion control apparatus comprises a multi-layered fabric assembly 60. In FIG. 33, only the top segment 311 of the bracket 310 is shown.

Figure 34:
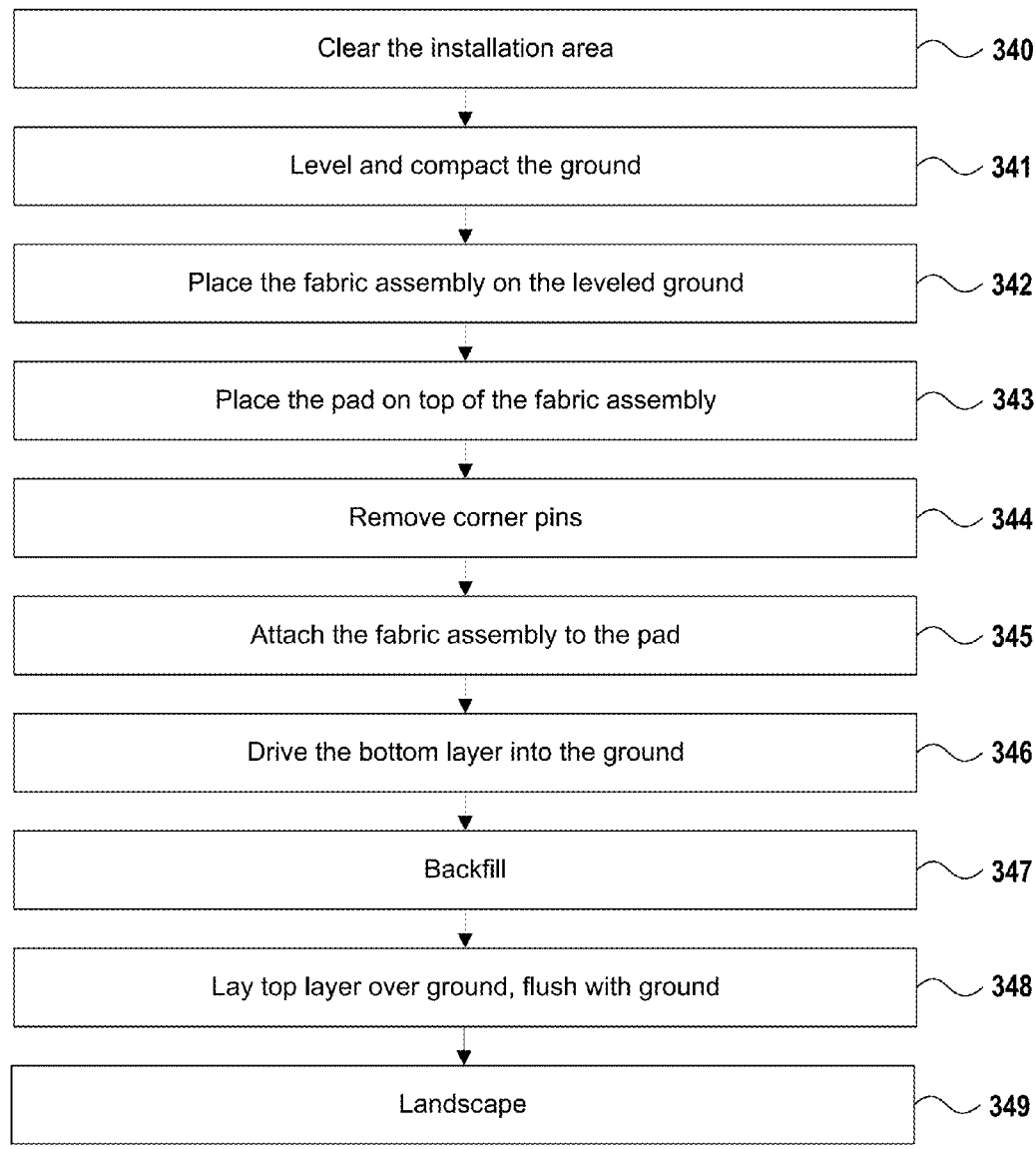
FIG. 34 is a flow chart of one embodiment of a method of installing a new equipment pad with a multi-layered fabric assembly.

FIG. 34 is a flow chart of one embodiment of a method of installing a new pad 10 with a multi-layered fabric assembly 60. In step 340, clear the installation area of leaves, mulch, and loose topsoil until firm ground is reached beyond the edges of the where the pad 10 is to be located. In step 341, level and compact the ground. Backfill, if necessary, to ensure that the pad 10 will sit on substantially level ground. In step 342, place the multi-layered fabric assembly 60 on the leveled ground, with the silt fence 35 on the bottom and the 3D percolating fabric layer 40 on top, and insert landscape pins through the percolating fabric layer 40 into the ground. Alternatively, attach the multi-layered fabric assembly 60 to the pad 10 prior to placing the pad 10 on the ground.

In step 343, place the pad 10 on the ground so that the fabric of the multi-layered fabric assembly 60 extends 6"-12" beyond each side of the pad. In step 344, remove any landscaping pins that are visible from the corners of the multi-layered fabric assembly 60, and save them for later use. In step 345, attach the multi-layered fabric assembly 60 to the pad 10. It is desirable to take care that all walls are held in place by the weight of the pad 10 and/or attached to the pad 10. Otherwise, the walls may give way over time. In step 346, lift the top percolating fabric layer 40 and drive the silt fence fabric layer 35 straight down into the ground, using the installation tool 280 or 300, all around the pad 10. The fabric mimics the soil retaining effect of landscape timbers. In step 347, backfill soil outside of the fabric up to the bottom of the pad 10. Compact the soil and repeat until the ground level is flush with the pad bottom.

In step 348, place the top percolating fabric layer 40 flush with the ground, thus mimicking the percolating effect of river rock. Using the pins saved in step 344, drive pins through the percolating fabric corners into the ground to secure the percolating fabric layer 40 in place. Finally, in step 349, landscape around the pad 10 to hide the multi-layered fabric assembly 60.

Figure 35:
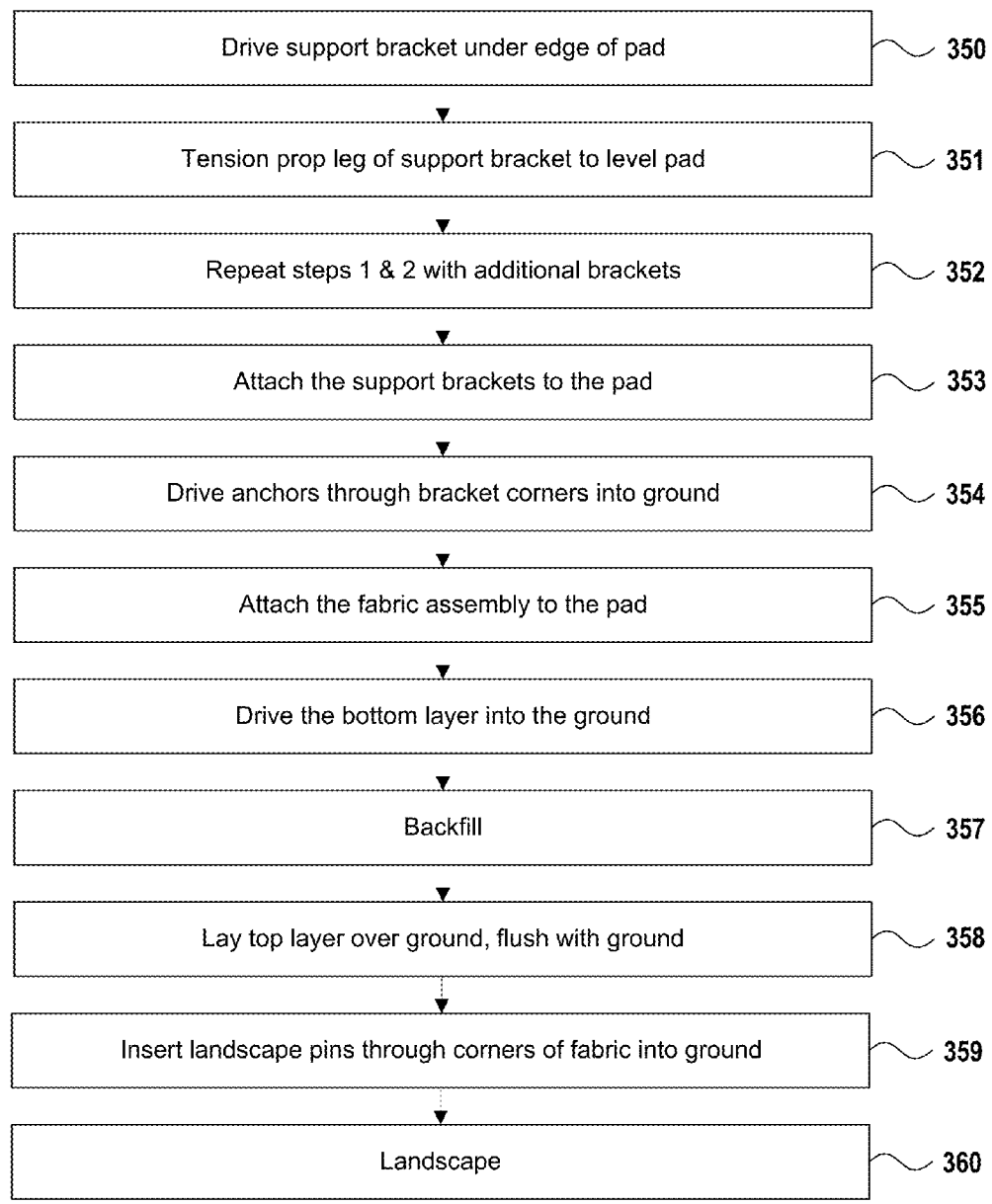
FIG. 35 is a flow chart of one embodiment of a method of repairing erosion underneath an equipment pad.

FIG. 35 is a flow chart of one embodiment of a method of repairing erosion underneath a pad 10 using the support brackets 310 of FIG. 31 and a multi-layered fabric assembly 60. In step 350, align one support bracket 310 under an edge of the pad 10, with the multi-layered fabric assembly 60 sticking out from under the pad 10. Drive the support bracket 310 into the earth parallel to the edge of the pad 10. In step 351, place the prop segment 312 of the support bracket 310 under the pad corner and tension until the pad 10 is level. In step 352, repeat steps 1 and 2 with additional brackets. In step 353, attach the support brackets 310 to the pad 10. In step 354, drive anchors (e.g., pins) through the bracket corners into the earth.

In step 355, attach the fabric assembly 60 to the pad 10. Take care that the multi-layered fabric assembly 60 is held in place by the weight of the pad 10 and/or attached to the pad 10. Otherwise, the fabric assembly 60 may give way over time. In step 356, lift the upper percolating fabric layer 40 on the downslope side of the pad 10 and drive the silt fence 35 into the ground, using installation tool 280 or 300, until the corners are in place. In step 357, backfill under the pad 10. From the sides, fill in any dirt or concrete to support the pad 10. Place bricks, rocks, dirt, soil socks, etc. under the pad 10. Pack the dirt. Also, lift the upper percolating fabric layer 40 and backfill dirt against the silt fence 35 on the downslope side of the pad 10. In step 358, place the upper percolating fabric layer 40 flush with the ground around the pad 10. In step 359, insert landscape pins through the corners of the percolating fabric layer 40 into the ground. Finally, in step 350, landscape around the pad 10 to hide the multi-layered fabric assembly 60. Be careful not to add landscaping that is high enough to interfere with the pad height or the inflow of air to the unit.

In both FIGS. 34 and 35, many of the steps are optional, and the order of the steps may in many instances be re-arranged. Instructions for installation of hard wall solutions are similar.

It will be understood that many modifications could be made to the embodiments disclosed herein and in the incorporated provisional application and its appendix without departing from the spirit of the invention. Having thus described exemplary embodiments of the present invention, it should be noted that the disclosures contained in the drawings are exemplary only, and that various other alternatives, adaptations, and modifications may be made within the scope of the present invention. Accordingly, the present invention is not limited to the specific embodiments illustrated herein, but is limited only by the following claims.

I claim:

1. An erosion control kit for an outdoor support pad for a condenser or transformer, the kit comprising:

a hard-walled ground-insertable soil retention barrier configured to be driven to or below a top surface of the support pad and to wrap around soil that is under at least a corner of the support pad resting on grade, the hard-walled barrier comprising:
- at least one soil-impermeable monolithic corner piece that is continuous and has first and second latitudinal dimensions that are configured to diverge at a 90° angle for embracing two sides of the support pad, the corner piece also having a longitudinal dimension that is elongated relative to its first latitudinal dimension; and
- at least one soil-impermeable planar piece;
- wherein the at least one corner piece and the at least one planar piece are configured to overlap to form a soil-impermeable barrier; and
- wherein the at least one corner piece and the at least one planar piece each comprise an attachment area configured to interface with the support pad above a bottom edge of the support pad and to locate a top edge of the soil retention barrier at or below, and no higher than, the top surface of the support pad.

2. The kit of claim 1, wherein the at least one corner piece is longer than the at least one planar piece so that the at least one corner piece is configured to be driven deeper into the ground.

3. The kit of claim 1, wherein the corner and planar pieces comprise fastening holes to facilitate attachment to the support pad.

4. The kit of claim 1, further comprising at least one gasket or sealing boss configured to seal at least a portion of the hard-walled ground-insertable soil retention barrier against the support pad.

5. The kit of claim 1, further comprising an insertion tool that is broad at its base and configured to interface with a hammer and a top edge of the corner and planar pieces to distribute the force of hammering and to facilitate insertion of the soil retention barrier into the soil alongside the support pad and below the top surface of the support pad while it rests on grade.

6. The kit of claim 1, further comprising one or more leveling support beams for leveling the support pad, wherein the leveling support beams are placed under the support pad and above sloped, eroded soil.

7. The kit of claim 6, wherein the support beams comprise at least one bracket.

8. The kit of claim 1, wherein the planar and corner pieces further comprise protrusions positioned along the latitudinal dimension of the pieces, the protrusions projecting from the faces that abut walls of the support pad and configured to contact walls of the support pad and to align the pieces with walls of the support pad and with each other; wherein after the pieces are inserted into the ground, the one or more protrusions rest between the support pad bottom edge and the ground, the top edge of the soil retention barrier extends above ground, and the area between the protrusions and the top edge is configured for attachment to the support pad.

9. The kit of claim 1, wherein each of the pieces is formed to interlock with one or more adjacent pieces.

10. The kit of claim 9, wherein at least some of the pieces are configured to be cut along their longitudinal dimension mid-section and retain the ability to interlock.

11. The kit of claim 1, wherein the corner piece is a unitary, 90° angle piece formed with at least one linear groove configured to receive a cooperating edge of a planar piece of the kit, and the corner piece is configured to align two planar pieces in perpendicular relation to each other.

12. The kit of claim 1, further comprising mechanical attachment members configured to secure the corner and planar pieces to the support pad.

13. An erosion control kit for an outdoor support pad for a condenser or transformer, the kit comprising:
- a hard-walled ground-insertable soil retention barrier configured to be driven to or below a top surface of the support pad and to wrap around soil that is under at least a corner of the support pad resting on grade, the hard-walled barrier comprising:
  - at least one soil-impermeable monolithic corner piece that is continuous and configured to embrace two sides of a 90° corner of the support pad; and
  - at least one soil-impermeable planar piece; and
- one or more brackets for leveling the support pad, wherein the one or more brackets are configured to be placed under the support pad and above sloped, eroded soil;
- wherein the at least one corner piece and the at least one planar pieces overlap to form a soil-impermeable barrier; and
- wherein the at least one corner piece and the at least one planar piece each comprise an attachment area configured to interface with the support pad above a bottom edge of the support pad and to locate a top edge of the soil retention barrier at or below, and no higher than, the top surface of the support pad.

14. The kit of claim 13, wherein the corner and planar pieces comprise fastening holes to facilitate attachment to the support pad.

15. The kit of claim 13, further comprising at least one gasket or sealing boss configured to seal at least a portion of the hard-walled ground-insertable soil retention barrier against the support pad.

16. The kit of claim 13, further comprising an insertion tool that is broad at its base and configured to interface with a hammer and a top edge of the corner and planar pieces to distribute the force of hammering and to facilitate insertion of the soil retention barrier into the soil alongside the support pad and below the top surface of the support pad while it rests on grade.

17. The kit of claim 13, wherein the corner and planar pieces each include an alignment shelf along the latitudinal dimension configured to abut the support pad wall and to align the pieces with walls of the support pad and with each other; wherein after the pieces are inserted into the ground, the alignment shelf rests between the support pad bottom edge and the ground, the top edge of the soil retention barrier extends above ground, and the area between the alignment shelf and the top edge is configured for attachment to the support pad.

18. The kit of claim 13, wherein at least some of the pieces are configured to interlock and to be cut along their longitudinal dimension mid-section and retain the ability to interlock.

19. The kit of claim 13, wherein the corner piece is formed with at least one linear groove configured to receive a cooperating edge of a planar piece of the kit, and the corner piece is configured to align two planar pieces in perpendicular relation to each other.

20. The kit of claim 13, further comprising mechanical attachment members configured to secure the one or more brackets and/or the corner and planar pieces to the support pad.

21. An erosion control kit for an outdoor support pad for a condenser or transformer, the kit comprising:
- a hard-walled ground-insertable soil retention barrier configured to be driven to or below a top surface of the support pad and to wrap around soil that is under at least a corner of the support pad resting on grade, the hard-walled barrier comprising:

at least one soil-impermeable corner piece that has first and second latitudinal dimensions that are configured to diverge at an angle for embracing two sides of the support pad, the corner piece also having a longitudinal dimension that is elongated relative to its first latitudinal dimension; and at least one soil-impermeable planar piece;

wherein the at least one corner piece and the at least one planar piece are configured to overlap to form a soil-impermeable barrier;

wherein the planar piece and the corner piece further comprise an alignment shelf configured to abut walls of the support pad and to align the pieces with each other and with walls of the support pad;

wherein after the pieces are inserted into the ground, the alignment shelf rests between the support pad bottom edge and the ground, with a top edge of the soil retention barrier extending above ground, and the area of the pieces between the alignment shelf and the top edge is configured for attachment to the support pad.

22. The kit of claim 21, wherein the at least one corner piece is longer than the at least one planar piece so that the at least one corner piece is configured to be driven deeper into the ground.

23. The kit of claim 21, wherein at least some of the pieces are configured to interlock and to be cut along their longitudinal dimension mid-section and retain the ability to interlock.

\* \* \* \* \*